United States Patent
Yoon (10) Patent No.: US 9,613,383 B2
(45) Date of Patent: Apr. 4, 2017

(54) POWER PLANT FIELD MONITORING SYSTEM AND METHOD USING QR CODE

(71) Applicant: KEPCO ENGINEERING & CONSTRUCTION COMPANY, INC., Gyeonggi-do (KR)

(72) Inventor: Chang Sun Yoon, Gyeonggi-do (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 0 days.

(21) Appl. No.: 14/757,421

(22) Filed: Dec. 23, 2015

(65) Prior Publication Data

US 2016/0188945 A1 Jun. 30, 2016

(30) Foreign Application Priority Data

Dec. 24, 2014 (KR) ........................ 10-2014-0188653

(51) Int. Cl.
*G06K 7/14* (2006.01)
*G06Q 50/06* (2012.01)
*G05B 23/02* (2006.01)

(52) U.S. Cl.
CPC ......... *G06Q 50/06* (2013.01); *G05B 23/0218* (2013.01); *Y02P 90/02* (2015.11)

(58) Field of Classification Search
CPC ........ G06Q 50/00; G06Q 50/06; G06Q 50/10; G06K 7/1417
See application file for complete search history.

(56) References Cited

U.S. PATENT DOCUMENTS

| | | | | |
|---|---|---|---|---|
| 2001/0056335 A1* | 12/2001 | Ikeda | ................. | G05B 23/0264 702/188 |
| 2003/0035137 A1* | 2/2003 | Shijo | ..................... | H04N 1/603 358/1.15 |
| 2003/0046339 A1* | 3/2003 | Ip | ........................... | H04L 41/12 709/203 |
| 2013/0026220 A1* | 1/2013 | Whelihan | ............ | G06Q 10/087 235/375 |

(Continued)

FOREIGN PATENT DOCUMENTS

| | | | |
|---|---|---|---|
| JP | 09325184 A | * | 12/1997 |
| KR | 2002-0086174 A | | 11/2002 |

(Continued)

OTHER PUBLICATIONS

English equivalent machine translation of JP 09-325184, retrieved from Japanese Patent Office on Jan. 6, 2017. https://www4.j-platpat.inpit.go.jp/eng/tokujitsu/tkbs_en/TKBS_EN_GM401_Detailed.action#.*

(Continued)

*Primary Examiner* — Suezu Ellis
(74) *Attorney, Agent, or Firm* — Nixon Peabody, LLP; Khaled Shami (57) ABSTRACT

Power plant field monitoring system and method using a QR code in which, when a user photographs a QR code attached to a monitoring field and transmits the photographed QR code to a route server, the route server transmits matching information that matches the transmitted QR code, from among process values at the monitoring field which are collected by a main control server, to a user terminal.

6 Claims, 7 Drawing Sheets

(56) References Cited

U.S. PATENT DOCUMENTS

| | | | |
|---|---|---|---|
| 2013/0186956 A1* | 7/2013 | Ashok | G06F 17/30 |
| | | | 235/385 |
| 2014/0258052 A1* | 9/2014 | Khuti | G06Q 10/087 |
| | | | 705/28 |
| 2015/0066997 A1* | 3/2015 | Thakur | H02J 13/0079 |
| | | | 707/812 |
| 2015/0170154 A1* | 6/2015 | Martin | G06Q 50/06 |
| | | | 705/304 |

FOREIGN PATENT DOCUMENTS

| | | |
|---|---|---|
| KR | 10-0971845 B1 | 7/2010 |
| KR | 10-20120133631 A | 12/2012 |

OTHER PUBLICATIONS

KR10-2014-0188653 Office Action dated Nov. 11, 2015.

\* cited by examiner

POWER PLANT FIELD MONITORING SYSTEM AND METHOD USING QR CODE

CROSS-REFERENCE TO RELATED APPLICATION

This application claims the benefit of Korean Patent Application No. 10-2014-0188653, filed on Dec. 24, 2014, in the Korean Intellectual Property Office, the disclosure of which is incorporated herein in its entirety by reference.

BACKGROUND

1. Field

One or more exemplary embodiments relate to a power plant field monitoring system and method using a quick reference (QR) code, and more particularly, to a power plant field monitoring system and method using a QR code, the system and method in which, when a user captures an image of a QR code attached to a monitoring field and transmits the captured QR code to a route server, the route server transmits matching information that matches the transmitted QR code, from among process values of the monitoring field which are collected by a main control server, to a user terminal, and thus, the user may conveniently check a process value at the monitoring field only by attaching the QR code to the monitoring field without having to additionally install a monitoring cabinet.

2. Description of the Related Art

In a power plant, information about a temperature, a pressure, a water level, and a flow rate may need to be monitored and controlled in real time. In a case of a power plant control signal in the related art, a control signal that includes a signal or process values generated from a pipe, a tank, or the like is transmitted to an instrument box corresponding to the control signal, and then, transmitted to a distributed control system (DCS) as an electrical signal via a transmitter installed in the instrument box. Then, a field manager check a value of the control signal via a monitor.

Although most signals are monitored by a main control room, a process value may need to be periodically checked in a monitoring field due to characteristics of a facility of a power plant, and a process signal should be monitored in the monitoring field to ensure soundness of a sensor or the like.

An information window for identifying a process value may be equipped in a transmitter installed in an instrument box in a field. However, a transmitter may not show a process value of a monitoring field according to a type of a transmitter.

Accordingly, in order to check a process value with respect to an instrument box in which a transmitter is actually installed, the instrument box should be opened, and radio equipment is needed to check whether the process value matches a value displayed on a DCS.

Although a field cabinet indicating a value of a sensor may be installed in a field of a power plant, field cabinets may not be unlimitedly installed for convenience of a field manager. Additionally, the field manager should go to a field cabinet, open the field cabinet, and check a process value in the field to know the process value. A process value at a location where a cabinet is not placed may not be checked.

If a transmitter that does not include a field indicator is installed in a field, a value of a field sensor may not be known in the field. Additionally, a process value at a location where a cabinet is not installed may not be known.

Accordingly, there is a demand for technology of checking a process value in a field if a transmitter that does not include a field indicator is installed in the field or if a field cabinet is not installed in a field.

SUMMARY

One or more exemplary embodiments include a power plant field monitoring system and method using a QR code, the system and method in which, when a user photographs a QR code attached to a monitoring field and transmits the photographed QR code to a route server, the route server transmits matching information that matches the transmitted QR code, from among process values at the monitoring field which are collected by a main control server, to a user terminal, and thus, the user may conveniently check a process value at the monitoring field only by attaching the QR code to the monitoring field without having to additionally install a monitoring cabinet.

Additional aspects will be set forth in part in the description which follows and, in part, will be apparent from the description, or may be learned by practice of the presented embodiments.

According to one or more exemplary embodiments, a power plant field monitoring system using a quick reference (QR) code includes: a field monitoring unit which is connected to a sensor for sensing a process value of a monitoring field and to which a QR code that includes an identification number and an access address of the monitoring field is attached; a main control server configured to collect process information, which includes an identification number of a monitoring field and a process value sensed at the monitoring field, from the field monitoring unit; a route server including a process database for receiving the process information from the main control server and storing process information about all monitoring fields, and configured to extract process information, which matches request information received from a user terminal, from the process database and transmit the process information to the user terminal; and a user terminal configured to capture an image of the QR code and transmit the request information to the route server and output the matching information transmitted from the route server.

According to one or more exemplary embodiments, a power plant field monitoring method using a quick reference (QR) code includes: (a) generating a process database (DB) configured to store an identification number and a process value of a monitoring field for each monitoring field, which is performed by a route server; (b) receiving process information that includes an identification number and a process value of a monitoring field for each monitoring field, and storing the process information in the process DB, which are performed by the route server; (c) capturing an image of a QR code attached to a monitoring field, generating request information requesting a process value corresponding to an identification number included in the QR code, and transmitting the request information to the route server, which are performed by a user terminal; and (d) extracting process information, which matches the request information, and transmitting the extracted process information to the user terminal.

According to one or more exemplary embodiments, a non-transitory computer-readable recording storage medium having recorded thereon a computer program, when executed by a computer, performs the power plant field monitoring method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list, As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept.

While such terms as "first," "second," etc., may be used to describe various components, such components must not be limited to the above terms. The above terms are used only to distinguish one component from another. For example, a first component may be referred to as a second component, and similarly, a second component may be referred to as a first component without departing from the scope of protection.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which example embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the inventive concept will be described in detail by explaining embodiments of the inventive concept with reference to the attached drawings. Like reference numerals in the drawings denote like elements.

Figure 1:
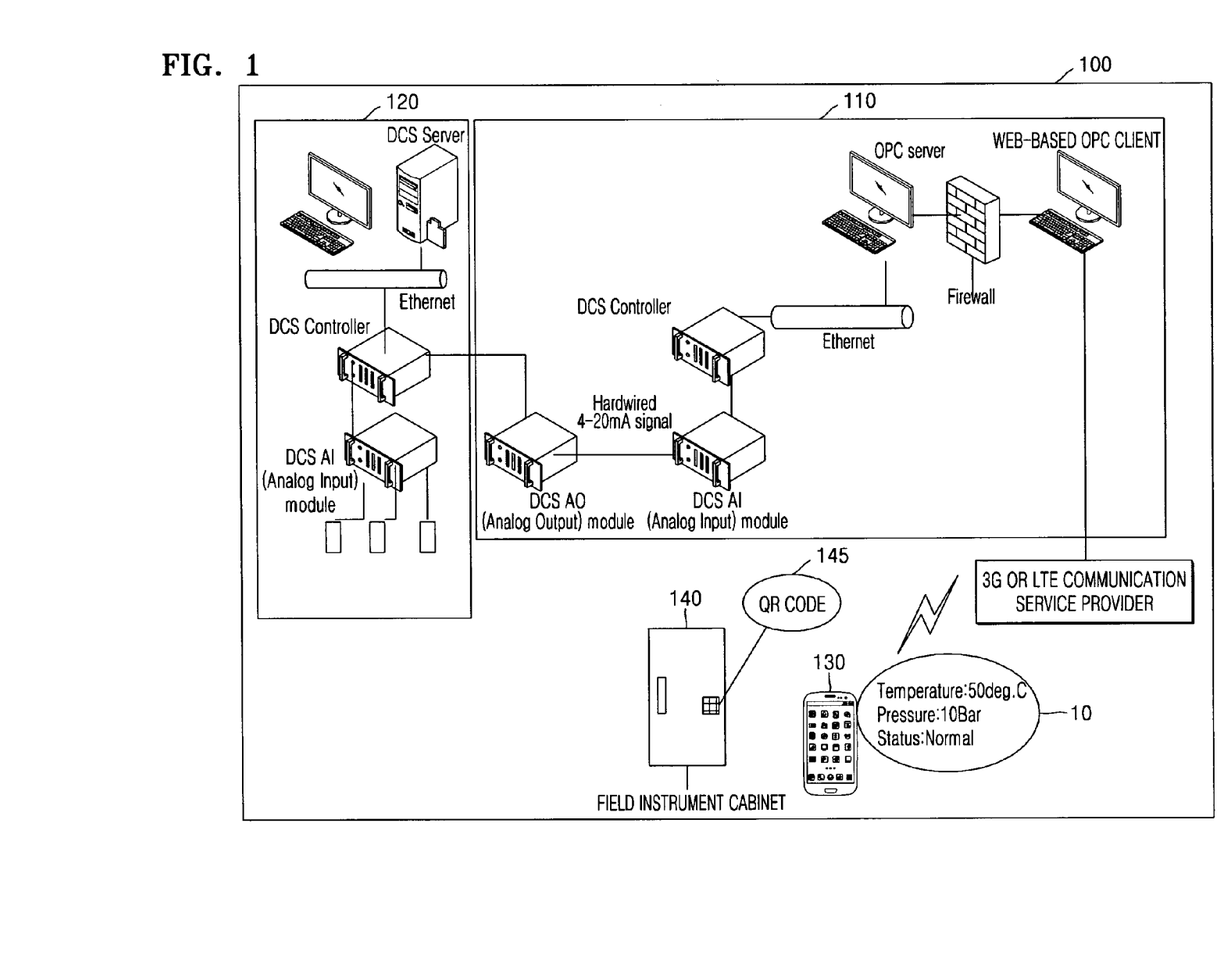
FIG. 1 is a diagram illustrating a power plant field monitoring system and method using a quick reference (QR) code according to an exemplary embodiment.

FIG. 1 is a diagram illustrating a power plant field monitoring system and method using a quick reference (QR) code according to an exemplary embodiment.

According to an exemplary embodiment, the power plant field monitoring system using a QR code includes a route server 110, a main control server 120, a user terminal 130, and at least one field monitoring unit 140.

The main control server 120 is also referred to as a distributed control system (DCS), and field process signals are input to the main control server 120 and displayed on a monitor of the main control server 120 or a transmitter installed in the at least one field monitoring unit 140.

While a field manager patrols a field, the field manager may go to a location where a cabinet or a transmitter in the at least one field monitoring unit 140 is installed and open the cabinet or the transmitter to identify a process value. However, if a transmitter does not include a display (as in a power plant where many times a display is not installed in a temperature transmitter), the field manager may not identify a process value of a pipe or a tank installed in the field.

According to an exemplary embodiment, a route server 110, which is physically separate from but connected to the main control server 120 via a hardwire (with an analog output of 4~20mA and a digital output of 24VDC) with respect to a signal input to the main control server 120 is constructed, due to the importance of security of the power plant.

Then, a process value is databased by using an open platform communication (OPC) server connected to a separate DCS controller via an Ethernet network.

Then, a signal is transmitted from the main control server 120 to a web-based OPC client via a firewall by using an OPC protocol, and a web page linked with the user terminal 130 is constructed.

The user terminal 130 is a portable terminal that may be connected to the route server 110 via wireless communication such as third generation (3G), fourth generation (4G), or wireless fidelity (WiFi). The user terminal 130 refers to a smart terminal in which various applications are installed, such as a smartphone, or a tablet computer, or the like.

A web page is constructed so that a signal necessary with respect to a QR code is displayed on the user terminal 130. In this case, only a logged-in user can open field data, by using a commercialized security QR code and a smartphone application. A smartphone application is an OPC client configured so that a signal transmitted from the OPC server is displayed on a smartphone.

A QR code 145 attached to the at least one field monitoring unit 140 such as each instrument box, a process pipe, or a tank is linked with a web page managed by the OPC server, and the web page displays a process value according to the QR code 145 in real time.

Even though security is broken and information is open to the outside, since there is not information about the field monitoring unit 140 and only a field manager who has accessed the QR code may know a location of the field monitoring unit 140, there is no need to worry about a security accident.

According to an exemplary embodiment, if the power plant field monitoring system is installed only in a main facility, the power plant field monitoring system and method may be conveniently applied to each monitoring field by using the user terminal 130 such as a smartphone or the like and the QR code 145 without having to use a separate field facility. Process monitoring may be performed even in a location where an instrument box is not present (e.g. a center point of a process pipe).

If the power plant field monitoring system and method are employed, a field manager may use the user terminal 130 such as a smartphone owned by the field manager without having to use separate communication equipment.

Figure 2:
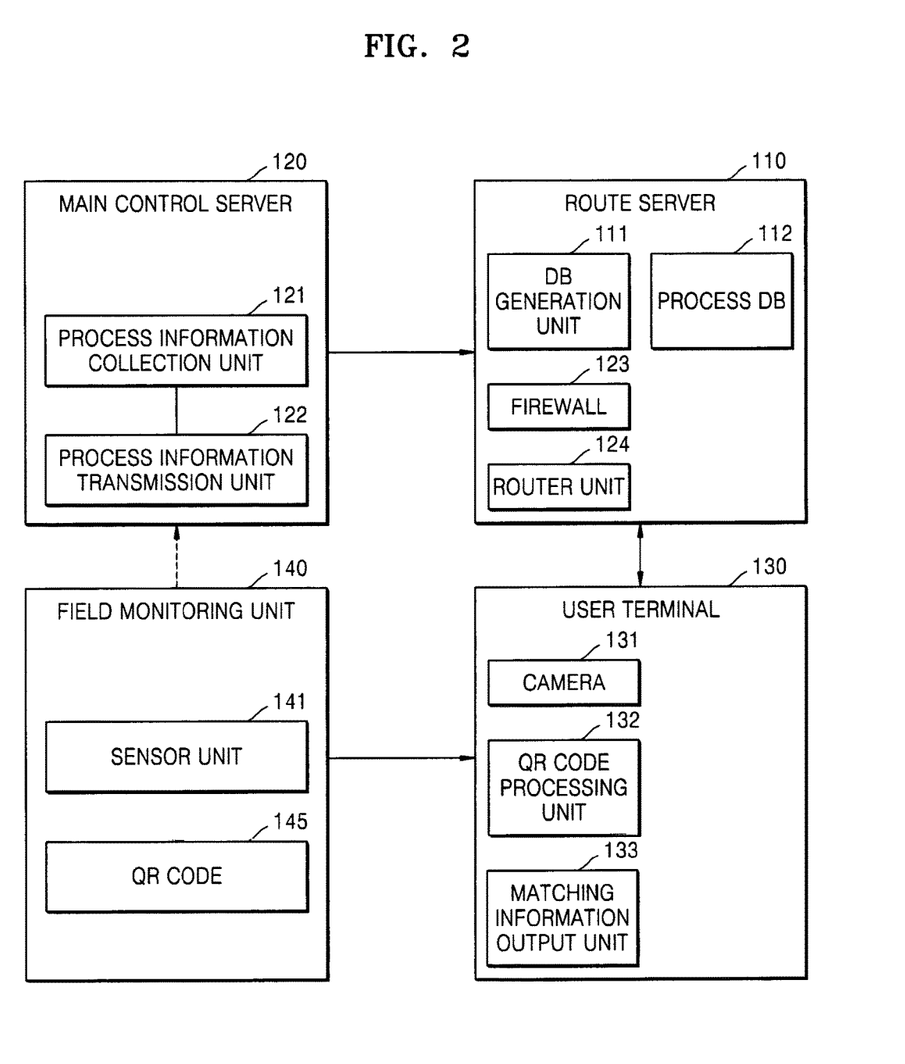
FIG. 2 is a block diagram of the power plant field monitoring system using a QR code, according to an exemplary embodiment.
Figure 3:
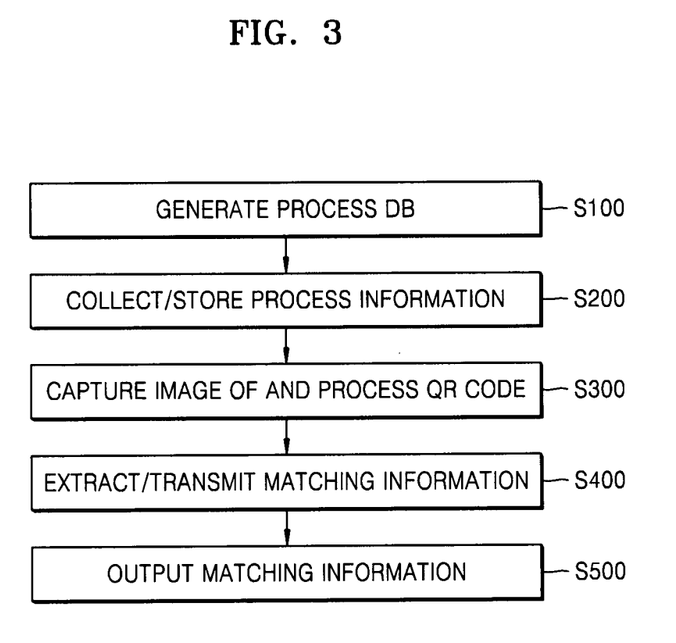
FIG. 3 is a flowchart of the power plant field monitoring method using a QR code, according to an exemplary embodiment.

FIG. 2 is a block diagram of the power plant field monitoring system using a QR code, according to an exemplary embodiment. FIG. 3 is a flowchart of the power plant field monitoring method using a QR code, according to an exemplary embodiment.

According to an exemplary embodiment, a description about the power plant field monitoring system using a QR code is substantially identical to a description about the power plant field monitoring method. Thus, hereinafter, the descriptions will be provided here together.

Referring to FIG. 1, according to an exemplary embodiment, a power plant field monitoring system 100 using a QR code includes at least one selected from the group consisting of the route server 110, the main control server 120, the user terminal 130, and at least one field monitoring unit 140.

The route server 110 routes the main control server 120 with the user terminal 130, databases and stores process information, collected by the main control server 120, and extracts a process value, which is requested by the user terminal 130 and matches a monitoring field, from a database and transmits the process value to the user terminal 130.

For this, the route server 110 may include at least one selected from the group consisting of a database (DB) generation unit 111, a process DB 112, a firewall 123, and a router unit 124.

In operation S100, the DB generation unit 111 generates the process DB 112 that is obtained by databasing a process value for each monitoring field.

In operation S200, the process DB 112 receives process information about all monitoring fields from the main control server 120 in real time, and databases and stores process information collected in real time for each monitoring field.

The process information includes an identification number of a monitoring field and a process value sensed through a sensor at the monitoring field. The identification number of a monitoring field refers to unique information for distinguishing various monitoring fields from each other.

The firewall 123 prevents leak of information stored in the main control server 120 or the process DB 112 to the outside.

The router unit 124 is connected to the process DB 112, receives request information that includes an identification number of a monitoring field from the user terminal 130 located outside, extracts process information, which matches the identification number included in the received request information, from the process DB 112, and transmits the extracted process information to the user terminal 130.

In operation S300, the user terminal 130 captures an image of a QR code attached to each field monitoring unit 140 and transmits, to the route server 110, request information requesting a process value that matches each field monitoring unit 140. Then, in operation S500, the user terminal 130 outputs matching information transmitted from the route server 110.

For this, the user terminal 130 includes a camera 131, a QR code processing unit 132, and a matching information output unit 133.

The camera 131 captures an image of a QR code attached to each field monitoring unit 140.

The QR code processing unit 132 interprets the QR code, reads an identification number included in the QR code and an access address, and transmits request information, which requests a process value corresponding to the identification number, to the route server 110 corresponding to the read access address.

The matching information output unit 133 receives matching information 10 that includes a process value, which matches the identification number included in the request information, from the route server 110 and outputs the matching information 10 on a screen so that a user identifies the process value.

The main control server 120 collects process information that includes an identification number of a monitoring field and a process value sensed at the monitoring field from the at least one field monitoring unit 140. For this, the main control server 120 includes a process information collection unit 121 and a process information transmission unit 122.

The process information collection unit 121 receives and collects process information in real time, which includes a process value sensed at each monitoring field and an identification number for identifying each monitoring field, from all field monitoring units 140.

The process information transmitting unit 120 transmits in real time the process information, collected in real time by the process information collection unit 121, to the route server 110.

The at least one field monitoring unit 140 is connected to a sensor for sensing a process value at a monitoring field, and a QR code that includes an identification number and an access address of the monitoring field is attached to the at least one field monitoring unit 140.

For this, the at least one field monitoring unit 140 includes a sensor unit 141 that includes at least one sensor for sensing a process value of a monitoring field, and the QR code 145 is attached to a periphery of the at least one field monitoring unit 140.

The QR code 145 includes an identification number for distinguish monitoring fields from each other, and an access address for accessing the route server 110.

Figure 4:
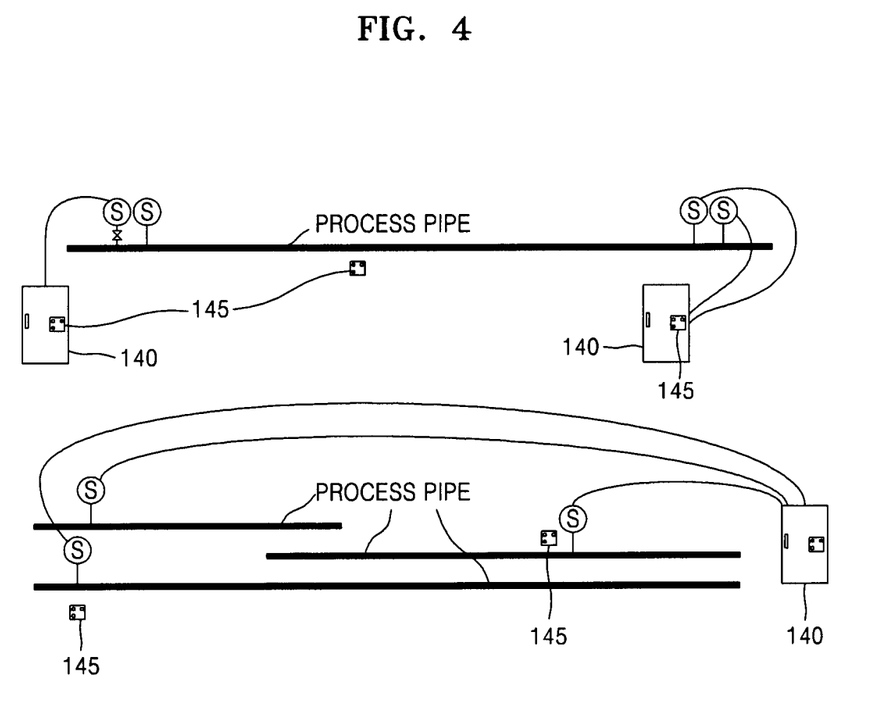
FIG. 4 illustrates an example of simply attaching a code to an area in which an instrument box is not present and process monitoring is needed, and identifying a process corresponding to the area by using an estimation value.

FIG. 4 illustrates an example of simply attaching a code to an area in which an instrument box is not present and process monitoring is needed, and identifying a process corresponding to the area by using an estimation value.

According to an exemplary embodiment, a field manager may identify a process value of each monitoring field, by capturing an image of the QR code 145 attached to each field monitoring unit 140 by using the user terminal 130.

Figure 5:
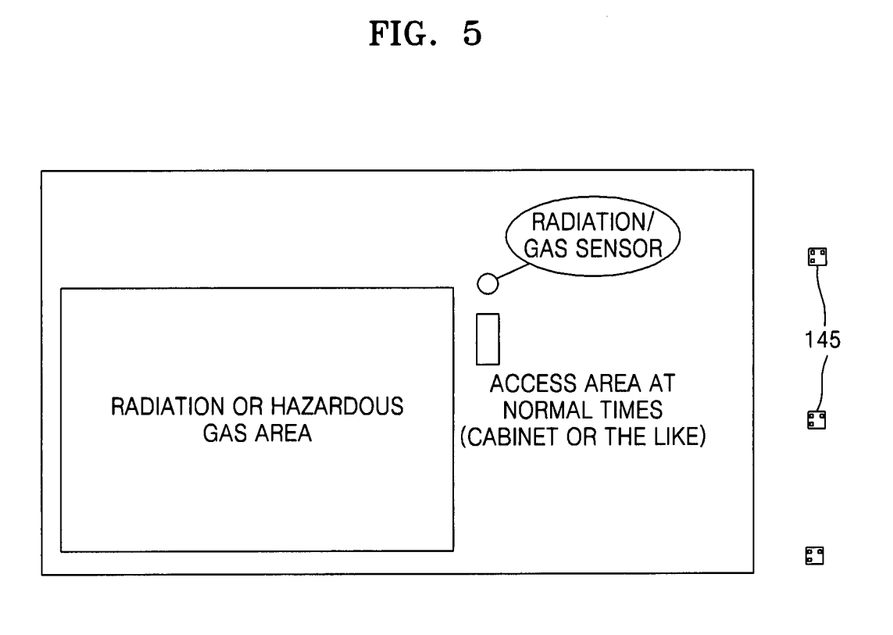
FIG. 5 illustrates an application example of knowing there is danger in an area before the area is accessed, by using a sensor installed in advance in the area where there is possible danger.

FIG. 5 illustrates an application example of knowing there is danger in an area before the area is accessed, by using a sensor installed in advance in the area where there is possible danger.

Figure 6:
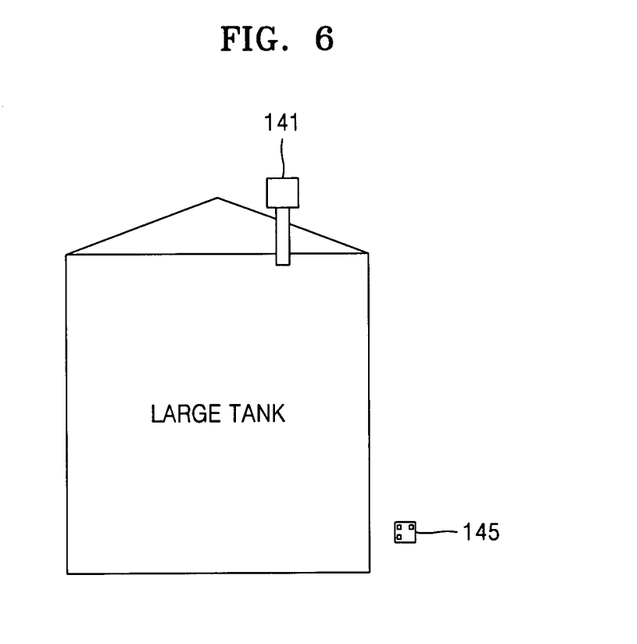
FIG. 6 illustrates an installation example of identifying a process value without having to go to a location where a sensor or an instrument box is installed if the sensor is located far away a field manager.

FIG. 6 illustrates an installation example of identifying a process value without having to go to a location where a sensor or an instrument box is installed if the sensor is located far away a field manager.

In FIG. 5 or 6, a field manager may identify a process value sensed by the sensor 141 that is installed in a monitoring field in an area where there is possible danger, without having to go to the area, by attaching a QR code 145 to a location outside the area or a location that is a long distance away from the area.

Figure 7:
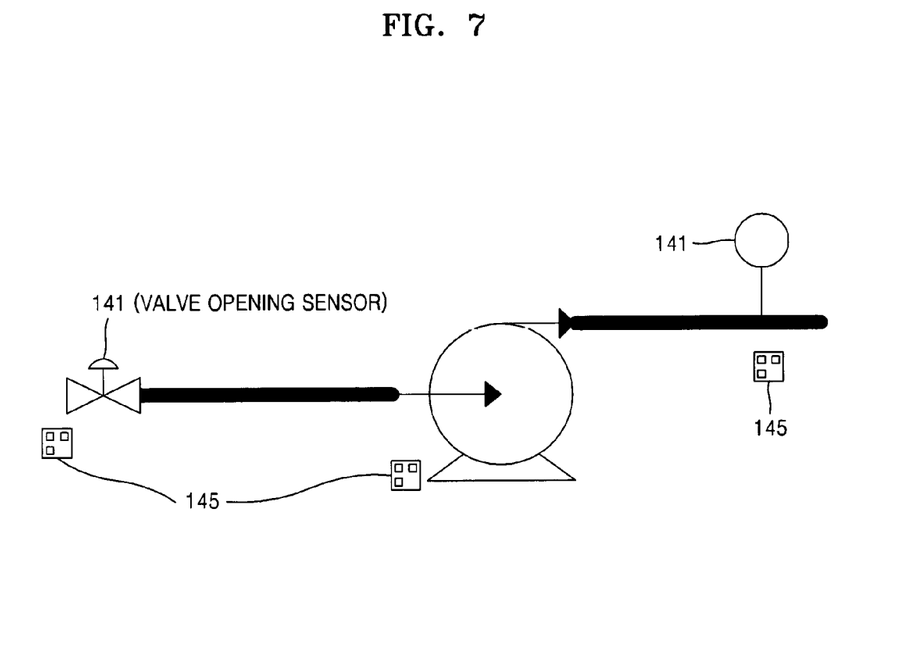
FIG. 7 illustrates an application example of identifying information other than a process value by applying the power plant field monitoring system, in a power plant field.

FIG. 7 illustrates an application example of identifying information other than a process value by applying the power plant field monitoring system, in a power plant field.

According to an exemplary embodiment, the field manager may identify a degree of openness of a valve which is sensed by a valve opening sensor included in the sensor unit 141 in a field where a pump is installed by capturing an image of the QR code 145 by using the user terminal 130. The field manager may also check whether a pump is operated and a state of operation of the pump by using various sensors 141.

According to one or more exemplary embodiments, if a power plant field monitoring system is constructed to connect to a main control server, a field monitoring unit having a same function as that of a monitoring cabinet may be added to the power plant field monitoring system with a lower cost with respect to all monitoring fields that are generated after the constructing, compared to a cost of adding a monitoring cabinet to a monitoring field. If the power plant field monitoring system is applied to an existing plant, since all process values monitored by the main control server may be processed, the power plant field monitoring system may be variously applied to all monitoring fields in a power plant or other plants.

The inventive concept can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A power plant field monitoring system using a quick reference (QR) code, the power plant field monitoring system comprising:

one or more power plant field monitoring units each comprising at least one sensor for sensing a process value of at least one monitoring field of a power plant and to which a QR code that includes an identification number and an access address of the at least one monitoring field is attached;

a main control server configured to collect process information, which includes an identification number of a monitoring field and a process value sensed at the monitoring field, from the one or more power plant field monitoring units;

a route server comprising a process database for receiving collected process information from the main control server and storing collected process information about all monitoring fields, and configured to extract process information, which matches request information received from a user terminal, from the process database and transmit the extracted process information to the user terminal; and the user terminal configured to capture an image of the QR code and transmit the request information to the route server and output the extracted matching process information transmitted from the route server, wherein the route server comprises:
 a process database configured to store process information about each monitoring field;
 a firewall configured to protect information in the process database; and
 a router unit connected to the process database and configured to receive the request information from the user terminal, extract the process information, which includes a process value that matches an identification number included in the received request information, from the process database, and transmit the extracted process information to the user terminal, wherein the route server is physically separate from, but connected to the main control server via a hardwire.

2. The power plant field monitoring system of claim 1, wherein the main control server comprises:

a process information collection unit configured to collect the process information from the one or more power plant field monitoring units; and a process information transmission unit configured to transmit the process information to the route server.

3. The power plant field monitoring system of claim 1, wherein the user terminal comprises:

a camera configured to capture the image of the QR code;

a QR code processing unit configured to analyze the captured image of the QR code, generate request information that requests the process value corresponding to the identification number of the one or more monitoring fields, which is included in the QR code, and transmit the request information to the route server corresponding to the access address included in the QR code; and a matching information output unit configured to output the matching process information, received from the route server, to a screen.

4. A power plant field monitoring method using a quick reference (QR) code, the power plant field monitoring method comprising:

(a) generating a process database configured to store an identification number and a process value of a monitoring field for each of one or more monitoring fields of a power plant, which is performed by a route server;

(b) receiving process information that includes an identification number and a process value of a monitoring field for each monitoring field from a main control server, and storing the process information in the process database, which are performed by the route server;

(c) capturing an image of a QR code attached to the one or more monitoring fields, generating request information requesting the process value corresponding to the identification number included in the QR code from the route server, and transmitting the request information to the route server, which are performed by a user terminal;

(d) extracting process information, which matches the request information, from the process database, and transmitting the extracted process information to the user terminal;

(e) transmitting the identification number and the process value to the main control server, which is performed by a field monitoring unit which comprises at least one sensor for sensing a process value of the one or more monitoring fields ; and (f) receiving the process information from the main control server via a firewall configured to protect information in the process database, which is performed by the route server, wherein the route server is physically separate from, but connected to the main control server via a hardwire.

5. The power plant field monitoring method of claim 4, further comprising:

(g) outputting the extracted process information, received by the user terminal, to a screen.

6. The power plant field monitoring method of claim 4, further comprising:

receiving a process value of a monitoring field from the at least one sensor installed in the one or more monitoring fields, generating the process information that includes the received process value and the identification number of the one or more monitoring fields, and transmitting the process information to the main control server.

* * * * *